United States Patent [19]

Shiraki et al.

[11] Patent Number: 4,667,208

[45] Date of Patent: May 19, 1987

[54] CONTROL SYSTEM FOR A COLOR PRINTER

[75] Inventors: Makoto Shiraki, Katsuta; Masashi Yoshida, Nakaminato; Jyunichi Matsuno, Toride, all of Japan

[73] Assignee: Hitachi, Ltd., Tokyo, Japan

[21] Appl. No.: 793,330

[22] Filed: Oct. 31, 1985

[30] Foreign Application Priority Data

Nov. 1, 1984 [JP] Japan .............................. 59-228965

[51] Int. Cl.4 .............................................. G01D 15/10

[52] U.S. Cl. ................................ 346/76 PH; 346/136

[58] Field of Search .................... 346/76 PH, 1.1, 134, 346/136, 76 R; 400/120, 240.3, 240.4, 224.2; 250/31 G; 219/216 PH

[56] References Cited

U.S. PATENT DOCUMENTS 4,532,525 7/1985 Takahashi ...................... 346/76 PH

*Primary Examiner*—Arthur G. Evans

*Attorney, Agent, or Firm*—Antonelli, Terry & Wands

[57] ABSTRACT

In a control system for a thermal transfer color printer capable of color print, first and second sensors for detecting a printing paper are disposed before and after a platen roller for carrying the printing paper, so that when the printing paper is carried and detected by the first sensor, the printing paper is changed to a low speed and at the same time a thermal head is pressed against the printing paper through an ink film and when the printing paper is detected by the second sensor, the thermal head is supplied with a print signal for color printing.

8 Claims, 5 Drawing Figures

CONTROL SYSTEM FOR A COLOR PRINTER

BACKGROUND OF THE INVENTION

1. Field of the Invention

This invention relates to a control method and apparatus for a thermal transfer color printer suited for color printing.

2. Description of the Related Arts

In the thermal transfer color printer for printing a color image, it is generally practised that an ink film having different ink layers formed thereon is overlapped on a printing paper and a thermal head is pressed against the ink film and printing paper. The thermal head is formed by the array of a plurality of heating elements, which are heated by a predetermined print signal to activate the ink of the ink film, thereby transferring the ink to the printing paper. This ink film has a role of base film on which for example, yellow, magenta and cyan thermal inks are sequentially coated in respective areas in this order. These inks, when supplied with heat energy from the heating elements, are melted into liquid state or sublimated into gas state and transferred to the printing paper.

For a color print, a color image is decomposed into three color components, and each color ink is transferred by the thermal head to the same area of the printing paper in accordance with the corresponding color component signal of the color image. For example, a yellow image is transferred to the printing paper, and a magenta image is transferred by the thermal head on the yellow-image printed area of the printing paper by using the magenta ink of the ink film. Further, similarly a cyan image is transferred thereto by using the cyan ink of the ink film, completing a multi-color print with gradation.

Therefore, in order to produce a color print of this type with no color shift, it is necessary to precisely carry the ink film and the printing paper.

As one of the methods of carrying the ink film and the printing paper, the ink film is carried in one direction by the rotation of a platen roller, and the printing paper is also carried together with the ink film in one direction (forward direction) during the transfer period but, when one color image has completely been transferred it is carried in the reverse direction back to the original position where the next color image is transferred to the same area of the printing paper. Thus, during transferring, the thermal head is pressed against the surface of the platen roller through the printing paper and the ink film, and the printing paper and the ink film are carried together by the rotation of the platen roller. When the transferring operation is finished, the thermal head is separated from the platen roller, so that only the printing paper can be carried in the reverse direction. One example of the thermal transfer color printer is disclosed in the National Technical Report, "High Speed Thermal Transfer Color Printer" Vol 30, No. 3 June 1984, P. 325 to 332.

Another example of the thermal transfer color printer is disclosed in Japanese Patent Unexamined Publication No. 58-27463 which was filed in Japan by Tokyo Shibaura Denki Inc. on Aug. 11, 1981 and laid open on Feb. 18, 1983. According to this publication, the printer has a platen roller opposite to the print head and a controller for controlling this platen roller, and this controller controls the platen roller to be pressed against the print head or separated therefrom on the basis of a print signal.

For the thermal transfer color printer for color print by superposition of a plurality of color images printed, there is proposed a control system in which a sensor for detecting the position of the printing paper is provided near the platen roller and the detected signal from the sensor is used to control the thermal head to move, the current supply to the head (, or printing operation), the speed at which the printing paper is carried, and so on.

SUMMARY OF THE INVENTION

It is an object of this invention to provide a control method and apparatus for a thermal transfer color printer, wherein the ink film and printing paper are controlled in their movement so that respective color printed images can be aligned with high precision to produce a high-quality color print with no color shift.

According to this invention, there is provided a control method and apparatus having first and second sensors respectively disposed on the upstream and downstream of the platen roller with respect to the forward carrying direction so as to detect the presence of the printing paper, the detected signals from the sensors being used so that the thermal head and the platen roller are switched to the print mode on the basis of the detected signal from the first sensor and thereafter the supply of current to the thermal head is started on the basis of the detected signal from the second sensor.

DESCRIPTION OF THE PREFERRED EMBODIMENT

Figure 1:
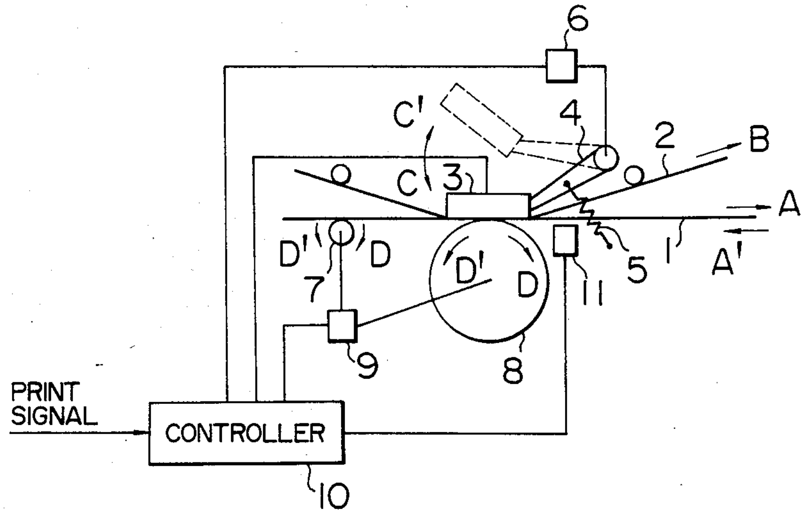
FIG. 1 is a schematic diagram of a thermal transfer color printer to which reference is made in explaining this invention.

FIG. 1 is a schematic diagram of a thermal transfer color printer having a recording paper detecting sensor.

Referring to FIG. 1, there are shown recording paper 1 which can be carried in the illustrated A-direction (forward direction) or A'-direction (reverse direction) by a recording paper carrying roller 7 and a platen roller 8, and an ink film 2 which can be carried only in the illustrated B-direction (forward direction). This ink film 2 is formed of a roll of a base film having formed thereon a series of frame-shaped coatings (with a predetermined area each) of yellow, magenta, cyan, yellow, . . . in this order in the film carrying direction.

A thermal head 3 is fixed to a head arm 4 which is connected to one end of a spring 5. The thermal head 3 and the head arm 4 can be moved between the printable position shown by solid lines (position C) and the non-printing position shown by broken lines (position C') by a head drive mechanism 6 comprised of a motor and gears (not shown).

The recording paper carrying roller 7 and the platen roller 8 are driven to rotate in the clockwise direction (direction D) or in the counter-clockwise direction (direction D') by a roller drive mechanism 9 formed by a motor and gears (not shown). The rotational speed of the rollers can also be selected to be a proper value. The roller drive mechanism 9 is also provided with an amount-of-rotation detector which is formed of an encoder and so on although not shown. This detector can precisely detect the amount that the platen roller 8 is rotated.

On the downstream side of the the platen roller 8 (in the arrow-A direction) there is disposed a printing paper detecting sensor 11, which detects the end of the printing paper 1 or a mark or the like provided on the printing paper 1 thereby to detect the position of the printing paper that is being carried.

This sensor may be an optical sensor formed of a light source and a light receiver, or a mechanical sensor such as a microswitch. Also, it is possible to print a special position marker at the end portion of the printing paper and optically read out it.

A detected signal from the sensor 11 is supplied to a controller 10, which then produces in response to the input signal control signals to the thermal head 3, the head drive mechanism 6 and the roller drive mechanism 9, respectively. While the controller 10 can be generally realized by a microcomputer, it may be formed of a combination of conventional electric circuits. The operation of the controller which is formed of a microcomputer will be described later.

The operation of the thermal transfer printer constructed as mentioned above is as follows.

To print (or transfer) on the printing paper 1, the printing paper carrying roller 7 and the platen roller 8 are rotated at high speed in the arrow-D direction to thereby carry the printing paper 1 in the forward direction (arrow-A direction) at high speed. At this time, the head drive mechanism 6 permits the thermal head 3 to be located in the non-printing position (shown by broken lines) indicated at C'. The ink film 2 is thus separated from the platen roller 8.

When the printing paper 1 is passed through the platen roller 8 and reaches a position which opposes the sensor 11, the sensor 11 detects the printing paper 1 and supplies the detected signal to the controller 10. Then, the controller 10 produces a head control signal and supplies it to the head drive mechanism 6 so as to make it in the print mode. Thus, the head drive mechanism 6, when supplied with the head control signal, permits the thermal head 3 to be moved to the printable position shown at C. As a result, the thermal head 3 is pressed against the platen roller 8 via the ink film 2 and the printing paper 1 by the tension force of the spring 5. The controller 10 also produces a speed control signal and supplies it to the roller drive mechanism 9, by which the printing paper carrying roller 7 and the platen roller 8 are switched from the high-speed rotation to the low-speed rotation for printing.

When the thermal head 3 is pressed against the platen roller 8, and the platen roller 8 is changed to the low-speed mode, the printing paper 1 and the ink film 2 are carried at low speed in the forward direction (arrow-A, arrow-B direction) by the rotational force of the platen roller 8. When the platen roller 8 is rotated by a certain minute angle, the amount-of-rotation detecting means not shown produces a rotation-detected signal and supplies it to the controller 10. The controller 10 thus produces a print signal in response to the input signal and supplies it to the thermal head 3, permitting the head to start printing.

During printing, the printing paper 1 and the ink film 2 are carried together in the forward direction. Since the thermal head 3 is in the fixed position during printing, the thermal head 3 prints the printing paper in accordance with the print signal while the position of the printing paper relative to the head is being changed.

When the printing with yellow ink is completed, the controller 10 supplies a head control signal to the head drive mechanism 6. The head drive mechanism 6 drives the thermal head 3 to move to the non-printing position (at C') in response to the control signal. At the same time, the controller 10 supplies a drive control signal to the roller drive mechanism 9. The roller drive mechanism 9 responds to the control signal to rotate the printing paper carrying roller 7 and the platen roller 8 at high speed in the arrow-D' direction so that the printing paper 1 is carried in the opposite direction (arrow-A'). At this time, since the thermal head 3 is in the C'-position, the ink film 2 is not acted upon by the rotational force from the platen roller 8 and thus is not carried. Also, at this time, the yellow ink region of the ink film 2 is already passed and the next magenta ink region stays at just the position where the magenta printing is to be made.

The printing paper 1 is moved by a certain amount in the reverse direction as described above, and stops. Then, the same operation as mentioned above is repeated. Similarly, the third color ink, or cyan ink region is used and finally the desired color printing is completed.

In this printing system shown in FIG. 1, however, since the platen roller 8 is changed from high to low speed within the period from when the printing paper 1 is detected by the sensor 11 to when current starts to be supplied to the thermal head 3, there is a possibility that at the instant of change of speed the printing paper 1 cannot follow the change and as a result slips on the surface of the platen roller 8 so that it is displaced relative to the roller 8. Since the print-starting timing is decided by detection of the amount of rotation of the roller after the sensor 11 detects the printing paper, the displacement between the printing paper 1 and the roller 8 causes color shift. Moreover, just when the thermal head is moved from the C'-position to C-position, the drive mechanism 9 for the platen roller 8 suffers from increase of load so that the platen roller may be changed in its speed. Consequently, color shift may be caused.

Figure 2:
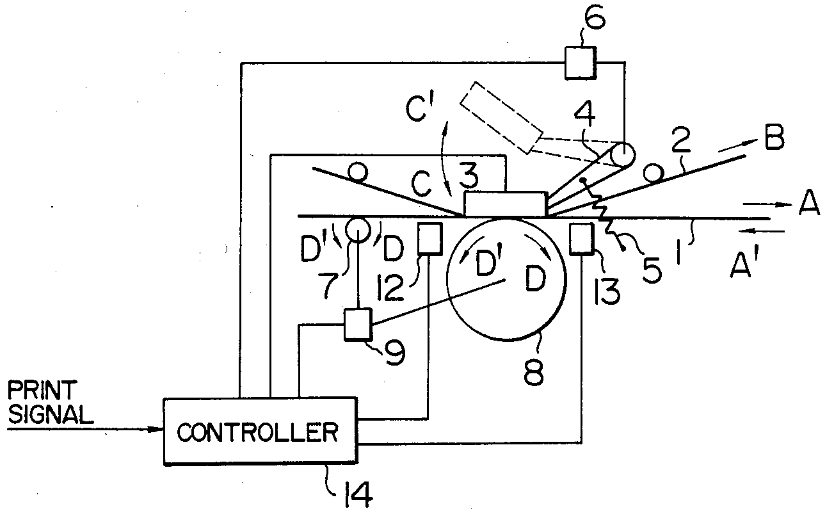
FIG. 2 is a schematic diagram of an embodiment of a thermal transfer color printer according to this invention.

In order to solve such problem, it is necessary to start printing just when the platen roller 8 is changed to low speed and the thermal head 3 has moved to the C-position. FIG. 2 is a schematic diagram of an embodiment of a thermal transfer color printer of this invention. In FIG. 2, like elements corresponding to those in FIG. 1 are identified by the same reference numerals.

Referring to FIG. 2, a first sensor 12 is disposed on the upstream side of the platen roller 8 in respect to the forward direction, and a second sensor 13 is disposed on the downstream side. Each of the sensors 12 and 13 can be constructed in the same way as the sensor 11 shown in FIG. 1 and detects the fore end of the printing paper 1 or mark on the printing paper 1 to thereby detect the position of the printing paper while it is being carried.

The detected signals from both sensors 12 and 13 are supplied to a controller 14, which then produces control signals and supply them to the thermal head 3, the head drive mechanism 6 and the roller drive mechanism 9, respectively, as described with reference to FIG. 1.

Figure 3:
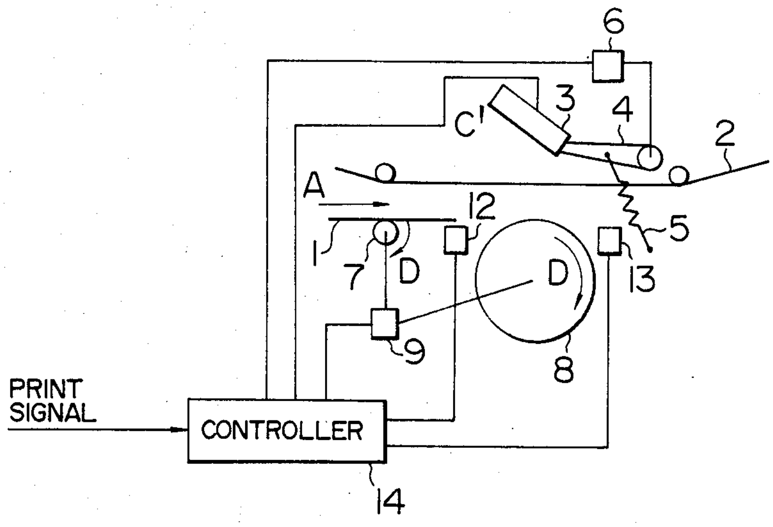
FIGS. 3 and 4 respectively show the conditions of the embodiment of FIG. 2 before printing and upon printing.

To print on the printing paper 1, as shown in FIG. 3, the printing paper carrying roller 7 and the platen roller 8 are rotated at high speed in the arrow-D direction to thereby carry the printing paper 1 at high speed in the forward direction (the arrow-A direction). At this time, the thermal head 3 is in the non-printing position shown at C′ and the ink film 2 is separated from the platen roller 8.

When the printing paper 1 reaches the position where it opposes the first sensor 12, the first sensor 12 detects the printing paper 1 and supplies the detected signal to the controller 14. The controller 14 supplies the drive control signal to the head drive mechanism 6 in synchronism with the detected signal from the first sensor 12 or a predetermined time later. The drive mechanism 6, when supplied with the control signal, drives the thermal head 3 to move to the printable position C from the non-printing position C′. At the same time, the controller 14 supplies the speed control signal to the roller drive mechanism 9, thereby changing its speed. The roller drive mechanism 9, when supplied with the control signal, changes the speeds of the printing paper carrying roller 7 and the platen roller 8 from high to low (printing speed) value. At this time, it is necessary that the fore end of the printing paper 1 be passed between the thermal head 3 and the platen roller 8 before the head 3 and the roller 8 are pressed against each other.

Figure 4:
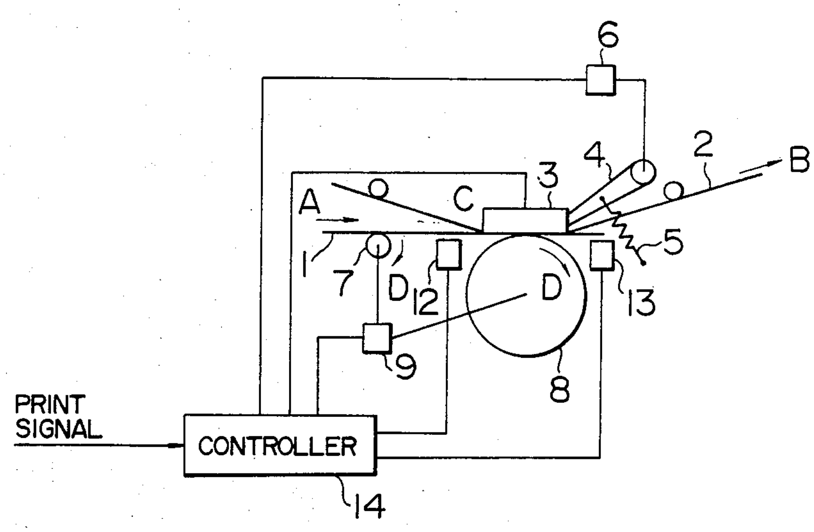

When the printing paper 1 is changed from high speed mode to low speed printing mode in this way, the printing paper 1 and the ink film 2 are carried at low speed in the forward direction (arrow-A, B direction) by the rotational force of the platen roller 8. Then, when the printing paper 1 reaches the position where it opposes the second sensor 13 as shown in FIG. 4, the second sensor 13 detects the printing paper 1 and supplies the detected signal to the controller 14. The controller 14 supplies the print signal to the thermal head 3 in synchronism with the detected signal from the second sensor 13 or a predetermined time later, thus the printing operation being started.

When this yellow-ink printing is completed, the controller 14 produces the drive control signal and supplies it to the head drive mechanism 6 on the basis of the signal from the amount-of-rotation detecting means (not shown) which can detect the amount that the platen roller 8 has rotated. Thus, the thermal head 3 is moved from the printable position C to the nonprinting position C′. At the same time, the controller 14 supplies the speed control signal to the roller drive mechanism 9, thereby changing the rotation direction of the printing paper carrying roller 7 and the platen roller 8 to the arrow-D′ direction (see FIG. 4).

When the printing paper carrying roller 7 and the platen roller 8 are rotated at high speed in the arrow-D′ direction, only the printing paper 1 is moved in the reverse direction, or in the arrow-A′ direction (see FIG. 1). When the printing paper 1 is moved to the upstream side of the platen roller 8, the controller 14 supplies the speed control signal to the roller drive mechanism 9, stopping the printing paper carrying roller 7 and the platen roller 8. Thus, the printing paper 1 stops at the position where the next printing is to be started. The ink film 2 is wound by take-up means (not shown) in the arrow-B direction so that the second color ink (magenta) region is fixed at a predetermined position.

Thus, the first yellow-ink printing is completed. Then, similarly, the same operations are repeated to print the second color (magenta) and third color (cyan) inks on the printing paper in superimposed manner, completing a color print.

Figure 5:
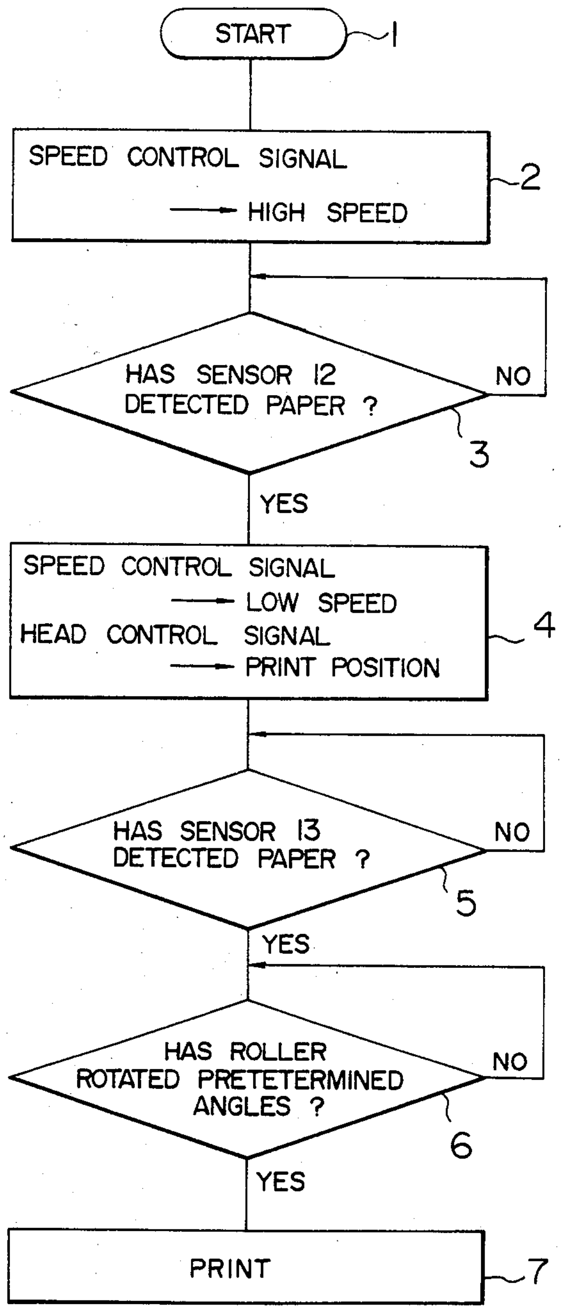
FIG. 5 is a flow chart for the operation of the controller for controlling the operation of a thermal transfer color printer according to this invention.

FIG. 5 is a flow chart of the control operation of the controller 14 formed by a microcomputer.

First, at step 1, a print command is given from the external. At step 2, the roller drive mechanism 9 is supplied with the speed control signal (high speed). At step 3, checking is made of whether the printing paper detected signal is supplied from the sensor 12 or not. If the detected signal is present, the program goes to the next step 4. At step 4, the speed control signal (low speed) is supplied to the roller drive mechanism 9 and at the same time the drive control signal (print position C) is supplied to the head drive mechanism 6. At step 5, it is checked whether the printing paper detected signal is present or absent. If it is present, the program goes to step 6. At step 6, it is checked whether a predetermined time has elapsed in which the printing paper has reached the position where the first printing is made by the thermal head 3, since the printing paper was detected by the sensor 13. If the predetermined time has elapsed, at step 7 the print signal is supplied to the heating element of the thermal head 3, by which the printing is made in accordance with the signal. The above-mentioned flow of operations is made for each color in substantially the same way.

In this embodiment, before the second sensor 13 detects the printing paper 1, the printer is in the print mode, or the thermal head 3 is pressed against the platen roller 8 and is still, and the speed of the printing paper 1 has already been low. Thus, the speed of the printing paper 1 is constant during the period from when the printing paper 1 is detected by the second sensor 13 to when current starts to be supplied to the thermal head 3. Therefore, even if when the printer is changed to the print mode on the basis of the detected signal from the first sensor 12, the speed of the printing paper 1 is changed by the slipping on the surface of the platen roller 8, the change of load to the motor for driving the platen roller 8 or the like, no color shift is caused since the time for the start of printing is decided by the detected signal from the second sensor 13.

We claim:

1. A control method for a thermal transfer color printer using an ink film having a plurality of different color thermal ink layers formed in a predetermined order, comprising the steps of:

carrying a printing paper at a predetermined speed;

detecting that said printing paper has reached a first predetermined position;

pressing a thermal head against said printing paper through said ink film;

carrying said printing paper and said ink film at a print speed slower than said predetermined speed by driving a platen roller at said print speed;

detecting that the printing paper passes through said first predetermined position and moves at said print speed and then reached a second predetermined position;

supplying a print signal to said thermal head while carrying said printer paper and said ink film at said print speed by driving said platen roller, thereby printing after said printing paper passes through said second predetermined position; and repeating the operations of said steps for each color ink.

2. A control apparatus for a thermal transfer color printer using an ink film having a plurality of different color thermal ink layers formed in a predetermined order, comprising:

printing paper carrying means capable of carrying a printing paper to be printed, at different speeds;

a thermal head responsive to a print signal to generate heat thereby transferring the thermal ink of said ink film to said printing paper;

head drive means responsive to a drive signal to press said thermal head against said printing paper through said ink film;

a first sensor for detecting that said printing paper moving at a predetermined speed by said carrying means has reached a first predetermined position, so as to generate a first detected signal;

a second sensor disposed on the downstream side in the forward direction contrary to said first sensor for detecting that said printing paper moving at a certain speed by said carrying means has reached a second predetermined position and so as to generate a second detected signal; and control means for controlling said carrying means, said thermal head, said head drive means, said first sensor and said second sensor for each color ink in such a manner that said carrying means is controlled to change the speed of said printing paper from a first speed to a print speed slower than said first speed in response to said first detected signal from said first sensor, and at the same time controlling said head drive means by suppplying said head drive means with said drive signal in response to said first detected signal, and said control means supplying said thermal head with said print signal in response to said second detected signal from said second sensor.

3. A control apparatus according to claim 2, wherein said first and second sensors are disposed along the path of the printing paper to be carried, said first sensor disposed on the upstream of a print position with respect to said forward direction and said second sensor disposed on the downstream thereof.

4. A control apparatus according to claim 2, wherein said control means supplies said print signal to said thermal head a predetermined time after being supplied with said second signal, said predetermined time being determined by the time interval from when said printing paper passes said second predetermined position at said print speed to when said printing paper arrives at the position of said thermal head.

5. A control apparatus according to claim 2, wherein said control means is formed by a microcomputer.

6. A control apparatus according to claim 2, wherein said first and second sensors are each formed by an optical sensor.

7. A control method according to claim 1, wherein said step of pressing a thermal head against said printing paper through said ink film is effected in response to detecting that said printing paper has reached the first predetermined position, and said step of supplying a print signal to said thermal head is effected in response to detecting that said printing paper reached the second predetermined position.

8. A control apparatus according to claim 2, wherein said carrying means includes a platen roller and said control means controls said carrying means to drive said platen roller at said print speed so as to carry said printing paper and said ink film, said control means supplying said print signal to said thermal head while said platen roller is being driven to carry said printing paper and said ink film at said print speed.

* * * * *